US011097754B2

United States Patent
Graham et al.

(10) Patent No.: US 11,097,754 B2
(45) Date of Patent: Aug. 24, 2021

(54) ELECTRONICALLY CONTROLLED PNEUMATIC RAILWAY CAR WITH END OF TRAIN DEVICE MODE

(71) Applicant: New York Air Brake LLC, Watertown, NY (US)

(72) Inventors: Samuel D. Graham, Mallorytown (CA); John W. LaDuc, Harrisville, NY (US); Brendan Wade Crowley, Cape Vincent, NY (US); Bryan M. McLaughlin, Watertown, NY (US); Dale R. Stevens, Adams Center, NY (US); David M. Socha, Watertown, NY (US); Roger B. Lewis, Stem, NC (US); Evan M. Hall, Evans Mills, NY (US)

(73) Assignee: New York Air Brake LLC, Watertown, NY (US)

( * ) Notice: Subject to any disclaimer, the term of this patent is extended or adjusted under 35 U.S.C. 154(b) by 403 days.

(21) Appl. No.: 16/266,179

(22) Filed: Feb. 4, 2019

(65) Prior Publication Data
US 2020/0247439 A1    Aug. 6, 2020

(51) Int. Cl.
| | |
|---|---|
| *B61L 15/00* | (2006.01) |
| *B60T 13/66* | (2006.01) |
| *B60T 13/68* | (2006.01) |
| *B60T 17/22* | (2006.01) |
| *B61L 25/02* | (2006.01) |

(52) U.S. Cl.
CPC ........ *B61L 15/0054* (2013.01); *B60T 13/665* (2013.01); *B60T 13/683* (2013.01); *B60T 17/228* (2013.01); *B61L 15/0036* (2013.01); *B61L 25/023* (2013.01)

(58) Field of Classification Search
CPC ............ B61L 15/0054; B61L 15/0036; B61L 25/023; B61L 25/028; B60T 13/665; B60T 13/683; B60T 17/228
See application file for complete search history.

(56) References Cited

U.S. PATENT DOCUMENTS

| | | | | |
|---|---|---|---|---|
| 5,374,015 A | * | 12/1994 | Bezos | ................. B61L 15/0027 246/169 R |
| 5,377,938 A | * | 1/1995 | Bezos | ................. B61L 15/0027 246/167 R |
| 5,777,547 A | | 7/1998 | Waldrop | |

(Continued)

FOREIGN PATENT DOCUMENTS

CA          2290728 A1      6/2000

*Primary Examiner* — Russell Frejd
(74) *Attorney, Agent, or Firm* — Bond Schoeneck and King PLLC; David Nocilly

(57) ABSTRACT

A system that allows an electronically controlled pneumatic (ECP) railcar to be optionally selected as the ECP End of Train (EOT) device when that car is positioned at the end of a train regardless of its physical orientation. This eliminates the requirement to use and install a traditional End of Train (EOT) device at the end of an ECP train while maintaining the same train integrity monitoring functionality that is typically provided for train brake-in-two detection and closed cut-out cock detection. The system also eliminates the requirement for a dedicated EOT device at the end of the train for ECP "RUN" Mode operation, and allows any ECP car to function normally as part of the train or act as the EOT device when selected.

15 Claims, 3 Drawing Sheets

(56) References Cited

U.S. PATENT DOCUMENTS

| | | | |
|---|---|---|---|
| 6,102,491 A * | 8/2000 | Bezos | B60T 13/665 246/167 R |
| 6,163,089 A * | 12/2000 | Kull | B61L 15/0054 307/151 |
| H001961 H * | 6/2001 | Runyon | 105/26.05 |
| 6,484,085 B2 * | 11/2002 | Marra | B60T 8/1705 246/182 B |
| 2005/0125112 A1 * | 6/2005 | LaDuc | B61L 15/0036 701/19 |
| 2018/0050711 A1 * | 2/2018 | Rice | B61L 15/0036 |

* cited by examiner ns positioned at either end of the railcar is located at the end of a train is operated to indicate that the railcar is at the end of a train. When the selection device is operated to indicate that the railcar is at the end of the train, an end-of-train beacon is broadcast over one of the first and second trainline network connectors from a car control device of the railcar. The selection device may also be operated to indicate which of the first and second intercar trainline network connectors is positioned at the rear of a train so that whichever of the first and second trainline connectors is indicated as positioned at the rear of the train is electrically isolated from the other of the first and second trainline connectors. The selection device may be a switch that can be set to indicate that the railcar is located at the end of the train and to indicate which of the first and second intercar trainline connectors is positioned at the rear of a train, such as a three way switch that can be moved between a first position indicating that the first trainline connector is at the end of the train, a second position indicating that the second trainline connector is at the end of the train, or a third position indicating that the railcar is not at the end of the train. Selection of a railcar as being at the end of the train may also cause the broadcast of a railcar specific identification along with an indication that the railcar has been selected as being located at the end of the train.

ELECTRONICALLY CONTROLLED PNEUMATIC RAILWAY CAR WITH END OF TRAIN DEVICE MODE

BACKGROUND OF THE INVENTION

1. Field of the Invention

The present invention relates to end-of-train functions and, more specifically, to a system and method of providing end-of-train functions in an electronically controlled pneumatic railway car.

2. Description of the Related Art

A traditional an end-of-train (EOT) device is an electronic device mounted on the last railway car of a train that can monitor and provide information, such as brake system status, to a head-end-unit (HEU) at the front of the train. Conventional EOT devices are powered by batteries that must be sufficiently charged at train departure and during a route. As a result, both the EOT devices and the batteries are subject to incorrect installation and equipment failure, thereby increasing maintenance costs, disrupting the operation of the train, and causing schedule delays. As a result, there is a need in the art for a system that can provide EOT functionality without the need for a dedicated EOT device, thereby reducing maintenance costs and the risk of delays due to EOT device problems.

BRIEF SUMMARY OF THE INVENTION

The present invention is an end-of-train system for an electronically controlled pneumatic (ECP) railcar having first and second intercar trainline network connectors positioned at either end. The system includes a selection device configured to indicate whether the ECP of the railcar is located at the end of a train and an end-of-train module programmed to determine whether the selection device has indicated that the railcar is at the end of the end of the train and to initiate the broadcast of an end-of-train beacon by a car control device of the railcar over one of the first and second trainline network connectors. The selection device indicates which of the first and second intercar trainline network connectors is positioned at the rear of a train so that trainline network connector identified as positioned at the rear of the train can be electrically isolated from the other trainline network connector. The selection device may be a switch that can be set to indicate that the railcar is located at the end of the train and to indicate which of the first and second intercar trainline network connectors is positioned at the rear of a train. For example, the switch can comprise a manual or electronic three way switch that can be moved between a first position indicating that the first trainline network connector is at the end of the train, a second position indicating that the second trainline network connector is at the end of the train, or a third position indicating that the railcar is not at the end of the train. The end-of-train module may be further programmed to broadcast a railcar specific identification along with an indication that the railcar has been selected as being located at the end of the train in response to the device indicating that the railcar is at the end of the train.

The present invention includes a method of providing end-of-train functions where a selection device that can indicate whether an electronically controlled pneumatic railcar having first and second intercar trainline network con-

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
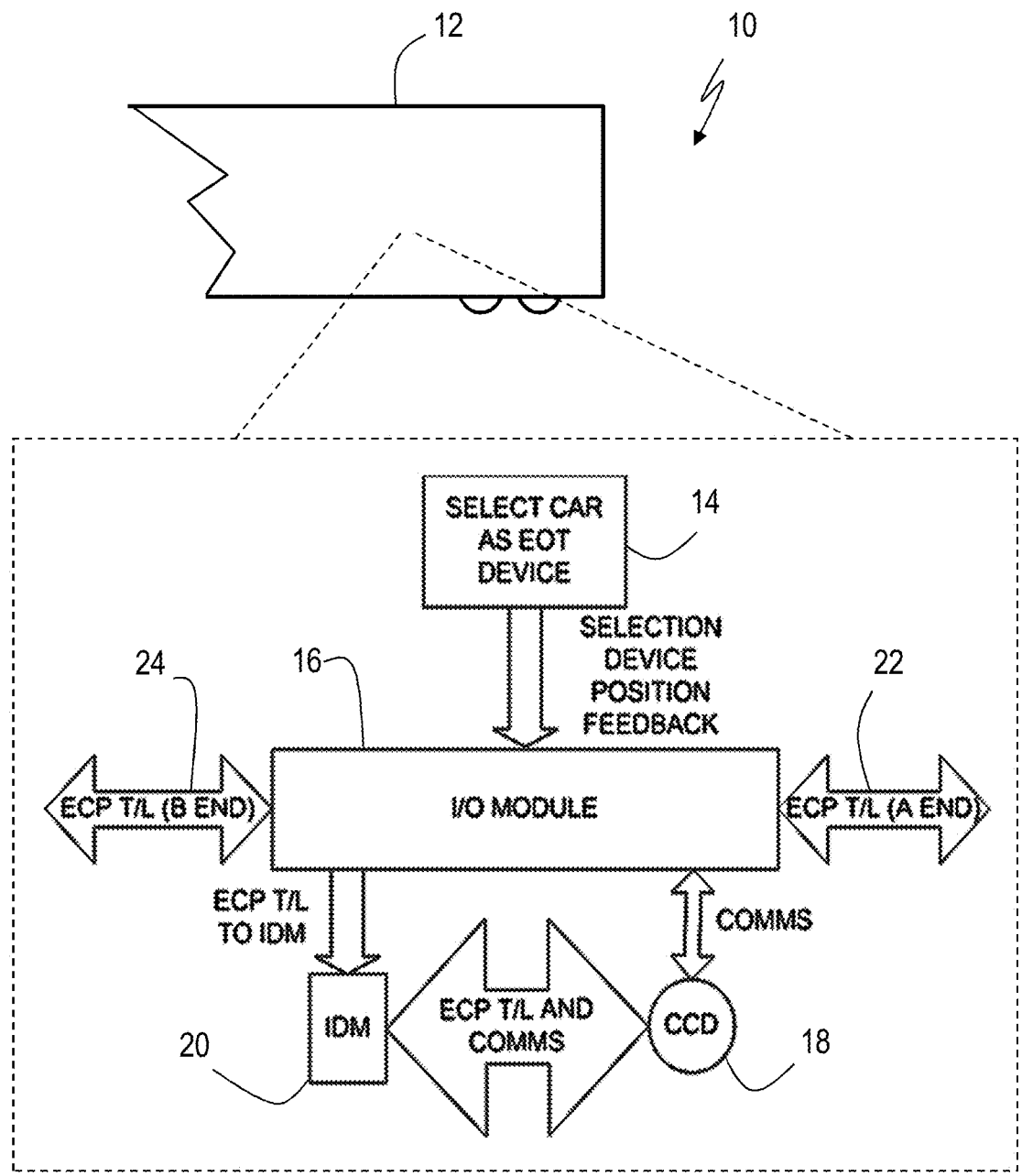
FIG. 1 is a schematic of a system for providing EOT functionality in an ECP railcar according to the present invention.

Referring to the figures, wherein like numerals refer to like parts throughout, there in seen in FIG. 1 an end-of-train (EOT) system 10 that is implemented in connection with an electronically controlled pneumatic (ECP) railway car 12 that can be configured to act in an EOT device mode. ECP car 12 is associated with a selection device 14 that can be used to manually or electronically select EOT device mode for ECP car 12. More specifically, the selection of EOT functions using selection device 14 is detected by an input/output (I/O) end-of-train module 16 that is in communication with the car control device (CCD) 18 of ECP car 12 and railcar specific identification module (IDM) 20. I/O module is programmed to implement EOT device mode according to the present invention by establishing the transmission of EOT status messages (referred to as EOT beacons) from ECP car 12 to the Head End Unit (HEU) of the train as well as the isolation of whichever of "A" end intercar ECP trainline communication network (ECP T/L) connector 22 or "B" end intercar ECP trainline connector 24 is positioned at the end of the train.

When I/O module detects initiation of EOT functions via selection device 14, I/O module places ECP car 12 into an EOT device mode whereby ECP car 12 acts as an EOT device. ECP car 12 provides the appropriate EOT status information to the HEU via connector 22 or 24 to indicate that ECP car 12 is at the end of the train. More specifically, CCD 18 obtains ECP car 12 identification using IDM 20 that provides a car specific network node, connects to the ECP network via the appropriate intercar connector 22 or 24, and identifies itself to the Head End Unit (HEU) as being in EOT device mode. CCD 18 also begins transmission of EOT status messages and ECP car identification to the HEU. ECP car 12 will communicate with the HEU regardless of its "A" or "B" orientation in the train to ensure inclusion of ECP car 12 in the train makeup as the last car in the train and to ensure that ECP car 12 is properly identified and is recognized as the ECP car 12 providing EOT device functionality. Once EOT beacons and identifying information are received by HEU from ECP car 12, ECP trainline power can be energized so that the conventional ECP RUN Mode may be selected by the train operator. For safety, the trainline may not be energized until an EOT signal is received, thereby demonstrating that the makeup of the train is complete.

Figure 2:
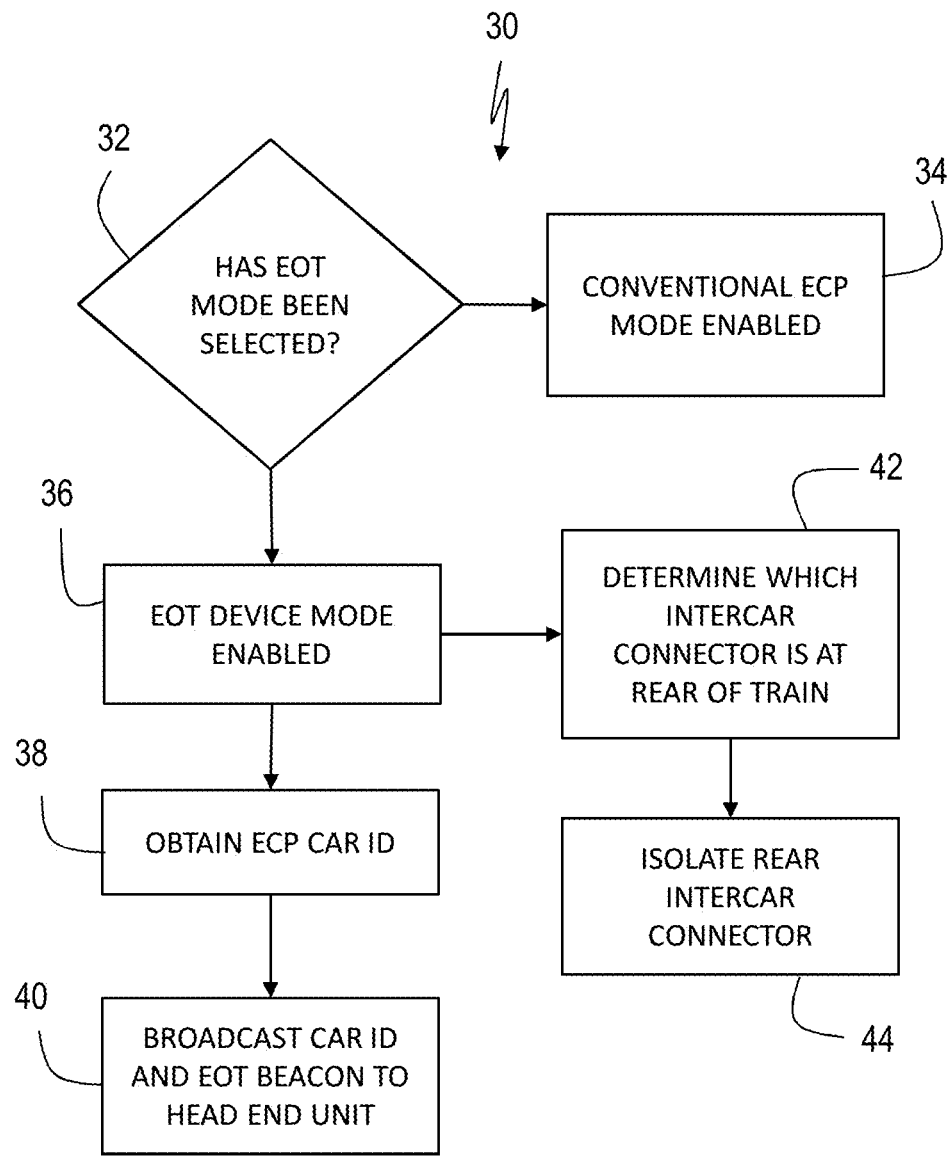
FIG. 2 is a flowchart of a method for providing EOT functionality in an ECP railcar according to the present invention.

Referring to FIG. 2, an exemplary process 30 implemented by I/O module 16 begins with a check whether EOT mode has been selected 32. If not, the conventional ECP mode is enabled 34 for ECP car 12. If so, EOT device mode is enabled 36. The ECP car ID is then obtained 38, and the ECP car ID and EOT beacons are broadcast 40 to the head end unit. As the same time, a determination is made which intercar connector is at the rear of the train 42 and that intercar connector is electrically isolated 44. The determination is made based on selection device 14, where one position must be selected before CCD 18 will enter EOT mode and begin broadcasting. Thus, steps 42 and 44 may be performed using selection device 14 rather than software.

CCD 18 will continue to transmit EOT beacons, normally once per second, to HEU, thereby acting as the last physical network node on the train. As a result, ECP car 12 can provide traditional EOT device train break-in-two detection by delivering continuous brake pipe pressure status to HEU. CCD 18 may thus include a brake pipe (BP) pressure transducer for determining EOT BP pressure status. This pressure status reporting can be used to verify trainline brake pipe continuity and to provide closed cut-out cock detection. ECP car 12, when switched into EOT device mode, can additionally transmit conventional ECP Car brake status information to HEU as it would normally do when acting as a conventional ECP car. Thus, in the event of a brake fault at ECP car 12, CCD 18 will transmit normal ECP car brake fault messages to HEU, just as any other ECP car in the train would do. In the event of a failure of CCD 18, EOT beacon transmissions to HEU will cease, thereby resulting in stoppage of the train as would be the case in the event of a failure of a conventional EOT device.

ECP car 12 is additionally configured to de-energize the rear-most intercar connector of ECP car 12 to mitigate any potential electrical shock hazard. Thus, when EOT mode is initiated via EOT selection device 14, ECP car 12 is configured to electrically isolate the rearmost "A" or "B" intercar connector 22 or 24. For example, in an exemplary embodiment of the invention, selection device 14 may comprise a switch having three positions, i.e., normal ECP, EOT mode with "A" intercar connector 22 at the rear, or EOT mode with "B" intercar connector 24 at the rear. ECP trainline voltage is then isolated to whichever intercar connector 22 or 24 is indicated by device 14 to be rearmost and thus to be isolated. In addition, the end of train intercar connector isolation circuit include a 50 ohm resistor/capacitor to provide network termination. The last connector is isolated from trainline power so there is no 240V direct current (DC) on the end of the train connector. In addition, there is a 50 ohm trainline impedance connecting the A and B trainlines to terminate the network (capacitor block the DC). This electrical isolation independent of ECP trainline and control voltage status is provided to ensure failsafe elimination of any potential electrical shock hazard at the end of the train connector. It should be recognized that the physically unterminated intercar connector 22 or 24 that is at the end of the train may still be manually fitted with an environmental plug to prevent water and contamination ingress. Selection device 14 may be a manually operated or controlled remotely via electronic signaling. Selection device 14 may alternatively comprise a separate smart module coupled to the rearmost intercar connector 22 or 24 that physically isolates that intercar connector 22 or 24 and communicates back to I/O to signal to initiate EOT device mode.

When ECP car 12 is not selected to operate in EOT device mode, selection device 14 is used to configure ECP car 12 for normal operation as part of an ECP Train. ECP Trainline voltage may then be connected to intercar connectors 22 and 24 at both ends of ECP car 12 to allow power and communication continuity through ECP car 12 for conventional ECP mode. Functionality of the car an EOT device is thus disabled, and ECP car 12 operates normally.

System 10 will comply with standard regulations regarding the use of EOT devices. For example, selection device 14 allows ECP car 12 to be selected either for normal operation when the car is positioned anywhere except as last car in an ECP train, or as the ECP EOT device to operate with integral ECP EOT functionality in addition to nominal ECP car functionality whenever the ECP car is positioned as the last car in the ECP train. As a result, a conventional ECP EOT device is no longer required for ECP Mode operations. System 10 also provides for an ECP car 12 that can sequence and operate in any mode selected regardless of physical orientation in the train. The ECP trainline remains physically connected to the IDM/CCD, and local area network (LAN) (or similar/equivalent) communications between IDM 20 and CCD 18 remain connected regardless of operational mode. System 10 will also ensure that the ECP trainline remains connected regardless of operational mode to allow CCD wake-up/battery charging whenever ECP trainline is energized by ECP mode. System 10 also ensures that ECP trainline voltage is isolated from the intercar connector at the end of the train regardless of car orientation whenever the ECP car is placed into EOT device mode. In the event of a power loss, the intercar connector at the end of the train will thus not have any ECP trainline voltage applied to it to prevent any potential electrical shock hazard.

Figure 3:
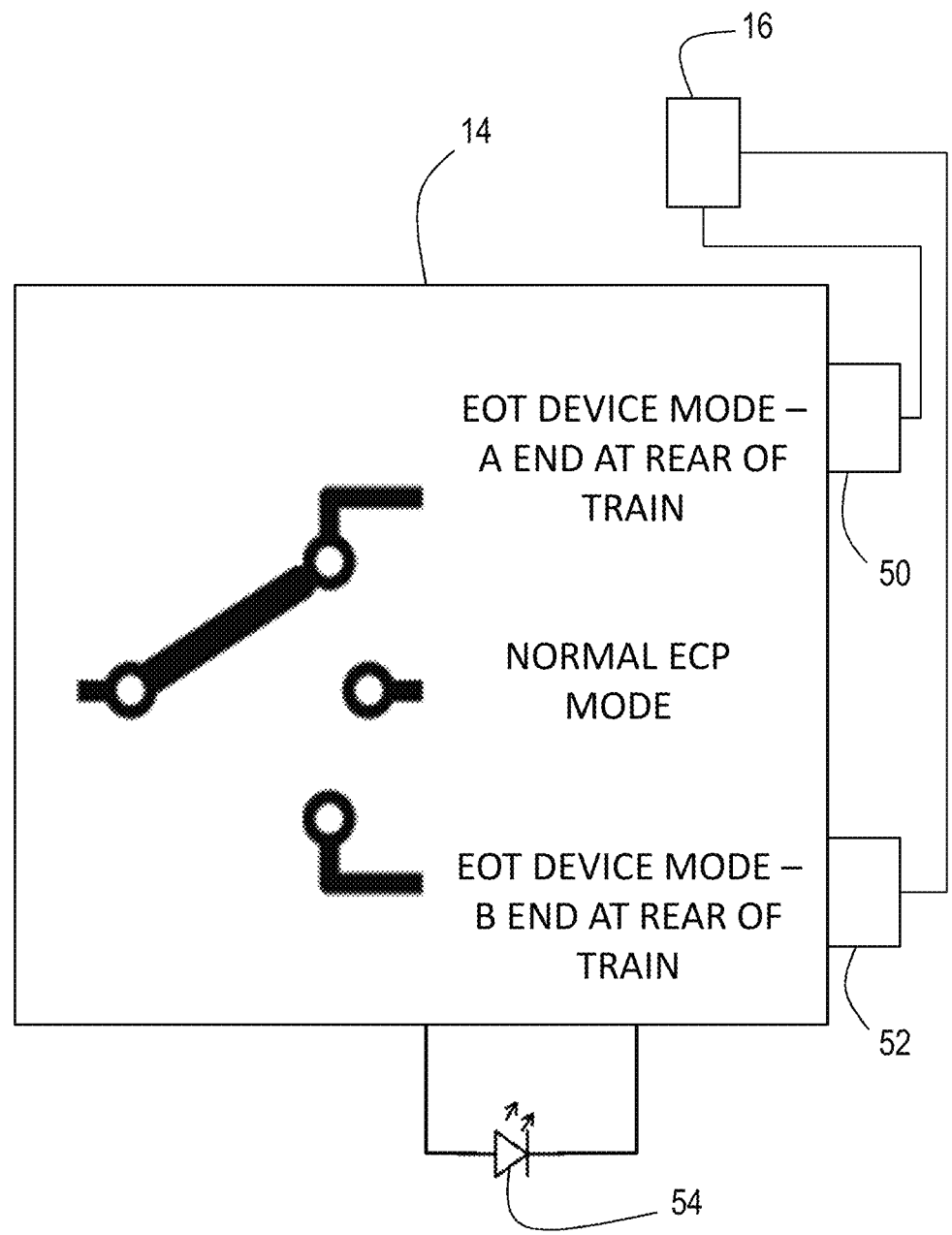
FIG. 3 is a schematic of an exemplary EOT device mode selection device according to the present invention.

In an embodiment, system 10 may implement logic with respect to the position of selection device 14 have three positions as seen in FIG. 3, where a first sensor 50 is used to detect the switch position entitled EOT DEVICE MODE—A END AT REAR OF TRAIN and a second sensor 52 is used to detect the switch position entitled EOT DEVICE MODE—B END AT REAR OF TRAIN. In this manner, only two sensors 50 and 52 need to be hardwired from selection device 14 to I/O end-of-train module 16 that is in communication with CCD 18. As explained below, software implementing logic can compare both inputs to confirm detection of valid switch positions prior to establishing the ECP car configuration with CCD 18. When ECP car 12 is first powered up, operation of the EOT device mode may automatically transition to the current position of selection device 14 as detected by I/O end-of-train module 16.

As seen in truth table set forth in Table 1 below, the outputs of the first and second sensors can be used to determine the desired functionality as well as fault conditions.

TABLE 1

| Switch 1 | Switch 2 | Switch Position Feedback Analysis | Position Detected | ECP T/L Connectivity |
|---|---|---|---|---|
| 0 | 0 | Valid Input | Normal ECP car | ECP T/T Power to Car "A End" and "B End" |
| 0 | 1 | Valid Input | Car B end selected as EOT | ECP T/T Power to Car "A End" with Car "B End" isolated |
| 1 | 0 | Valid Input | Car A end selected as EOT | ECP T/T Power to Car "B End" with Car "A End" isolated |
| 1 | 1 | Invalid Input | ECP emergency brake application | ECP T/T Power isolated from both Car "B End" and Car "A End" |

As seen in Table 1, when no input is detected from either switch sensor, selection device 14 is in the central position indicating NORMAL ECP MODE or has been isolated from system 10. In either case, ECP car 12 is configured for normal ECP operation. This approach allows ECP car 12 to remain in service as an ECP car if the remote switch cable is disconnected as ECP T/L power is connected through the car interface box. If ECP car is positioned at the end of the train and selection device 14 is in either EOT DEVICE MODE position with the cable disconnected, the train will not enter ECP run mode without an EOT device. If an invalid position is detected, e.g., both switch sensors are active, ECP T/L power may be isolated at both ends of the car, thereby causing an ECP emergency brake application.

As seen in FIG. 2, a visual indicator, such as LED 54, that is responsive to the switch position feedback analysis may be provided in a readily visible location to the train operator to provide a local visual indication of selection device 14 status. The LED may also provide a troubleshooting aid to help identify any ECP car 12 that has had selection device 14 inadvertently positioned incorrectly without an operator having to check the physical status of each selection device 14, particular if selection device 14 is positioned in a harder to access location. As ECP T/L continuity through CCD 18 is hardwired to transition to the current setting of selection device 14, control software and LED 54 must also automatically transition to the current position of selection device 14 to synchronize with switching of ECP T/L within CCD 18. While powered in ECP mode, LED 54 should be activated whenever selection device 14 is positioned in either EOT position.

As described above, the present invention may be a system, a method, and/or a computer program associated therewith and is described herein with reference to flowcharts and block diagrams of methods, apparatus (systems). The flowchart and block diagrams illustrate the architecture, functionality, and operation of possible implementations of systems, methods, and computer program products of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part of (or all of) one of more of the blocks illustrated in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A end-of-train system, comprising:
    a selection device configured to selectively indicate whether an electronically controlled pneumatic railcar having first and second intercar trainline network connectors positioned at either end of the electronically controlled pneumatic railcar is located at the end of a train;
    an end-of-train module programmed to determine whether the selection device has indicated that the electronically controlled pneumatic railcar is at the end of the end of the train and to initiate a broadcast of an end-of-train beacon by a car control device of the electronically controlled pneumatic railcar over one of the first and second intercar trainline network connectors.

2. The system of claim 1, wherein the selection device is further configured to indicate which of the first and second intercar trainline network connectors is positioned at a rear of a train.

3. The system of claim 2, wherein the first or second intercar trainline network connector identified as positioned at the rear of the train is electrically isolated from the other of the first or second intercar trainline network connector.

4. The system of claim 3, wherein the selection device comprises a switch that is settable indicate that the electronically controlled pneumatic railcar is located at the end of the train and to indicate which of the first and second intercar trainline network connectors is positioned at the rear of a train.

5. The system of claim 4, wherein the switch comprises a three way switch that is movable between a first position indicating that the first trainline network connector is at the end of the train, a second position indicating that the second trainline network connector is at the end of the train, and a third position indicating that the electronically controlled pneumatic railcar is not at the end of the train.

6. The system of claim 5, wherein the switch is manual.

7. The system of claim 1, wherein the end-of-train module is further programmed to broadcast a railcar specific identification along with an indication that the electronically controlled pneumatic railcar has been selected as being located at the end of the train in response to the selection device indicating that the electronically controlled pneumatic railcar is at the end of the train.

8. The system of claim 1, further comprising an indicator interconnected to the selection device to provide a visual indication of whether the selection device is set to indicate that the electronically controlled pneumatic railcar is located at the end of the train.

9. A method of providing end-of-train functions, comprising the steps of:

providing a selection device that is moveable to indicate whether an electronically controlled pneumatic railcar having first and second intercar trainline network connectors positioned at either end of the electronically controlled pneumatic railcar is located at the end of a train;

operating the selection device to indicate that the electronically controlled pneumatic railcar is at the end of the train; and initiating the broadcast of an end-of-train beacon over one of the first and second intercar trainline network connectors from a car control device of the electronically controlled pneumatic railcar after the selection device has indicated that the electronically controlled pneumatic railcar is at the end of the train.

10. The method of claim 9, wherein the selection device also indicates which of the first and second intercar trainline network connectors is positioned at a rear of the train.

11. The method of claim 10, further comprising the step of electrically isolating whichever of the first and second intercar trainline network connectors is indicated as positioned at the rear of the train from the other of the first and second intercar trainline network connectors.

12. The method of claim 11, wherein the selection device comprises a switch that is settable to indicate that the electronically controlled pneumatic railcar is located at the end of the train and to indicate which of the first and second intercar trainline network connectors is positioned at the rear of the train.

13. The method of claim 12, wherein the switch comprises a three way switch is movable between a first position indicating that the first intercar trainline network connector is at the end of the train, a second position indicating that the second intercar trainline network connector is at the end of the train, and a third position indicating that the electronically controlled pneumatic railcar is not at the end of the train.

14. The method of claim 13, wherein the step of operating the selection device to indicate that the electronically controlled pneumatic railcar is at the end of the train comprises manually moving the three way switch to one of the first position or the second position.

15. The method of claim 9, wherein the end-of-train module is further programmed to broadcast a railcar specific identification along with an indication that the electronically controlled pneumatic railcar has been selected as being located at the end of the train in response to the device indicating that the electronically controlled pneumatic railcar is at the end of the train.

* * * * *